United States Patent
Dudar et al.

(10) Patent No.: US 10,037,632 B2
(45) Date of Patent: Jul. 31, 2018

(54) SURROGATE VEHICLE SENSORS

(71) Applicant: Ford Global Technologies, LLC, Dearborn, MI (US)

(72) Inventors: Aed M. Dudar, Canton, MI (US); Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 29 days.

(21) Appl. No.: 15/254,048

(22) Filed: Sep. 1, 2016

(65) Prior Publication Data
US 2018/0061148 A1    Mar. 1, 2018

(51) Int. Cl.
G07C 5/08     (2006.01)
G07C 5/00     (2006.01)
G08G 5/00     (2006.01)
G08G 1/16     (2006.01)
H04L 29/08    (2006.01)

(52) U.S. Cl.
CPC ......... *G07C 5/008* (2013.01); *G07C 5/0816* (2013.01); *G08G 1/168* (2013.01); *G08G 5/0069* (2013.01); *G08G 5/0078* (2013.01); *H04L 67/12* (2013.01)

(58) Field of Classification Search
CPC ...... G07C 5/008; G07C 5/0816; G08G 1/168; G08G 5/0078; G08G 5/0069; H04L 67/12
See application file for complete search history.

(56) References Cited

U.S. PATENT DOCUMENTS

| 5,680,096 | A | 10/1997 | Grasmann |
| 7,765,062 | B2 | 7/2010 | Ariyur et al. |
| 7,970,507 | B2 | 6/2011 | Fregene et al. |
| 9,056,676 | B1 * | 6/2015 | Wang ................. B64F 1/00 |
| 9,154,893 | B1 | 10/2015 | Breed |
| 2011/0074565 | A1 | 3/2011 | Cuddihy et al. |
| 2014/0309853 | A1 | 10/2014 | Ricci |
| 2016/0016663 | A1 * | 1/2016 | Stanek ................. B60R 16/02 701/3 |
| 2016/0129999 | A1 | 5/2016 | Mays |
| 2016/0272113 | A1 | 9/2016 | Lopez-Hinojosa et al. |
| 2016/0282864 | A1 | 9/2016 | Lamm et al. |

(Continued)

FOREIGN PATENT DOCUMENTS

| GB | 2548369 A | 9/2017 |
| WO | 2008055306 A1 | 5/2008 |
| WO | 2017082903 A1 | 5/2017 |

OTHER PUBLICATIONS

"Ford Targets Drone-To-Vehicle Technology to Improve Emergency Services, Commercial Business Efficiency," Ford Media Center Las Vegas, Jan. 5, 2016.

(Continued)

*Primary Examiner* — Mussa A Shaawat
*Assistant Examiner* — Michael V Kerrigan
(74) *Attorney, Agent, or Firm* — Frank A. MacKenzie; Bejin Bieneman PLC

(57) ABSTRACT

Upon detecting a failure in a sensor in a vehicle, a request for a surrogate sensor is sent. Communications are established with an unmanned aerial vehicle carrying the surrogate sensor. A vehicle subsystem is actuated based at least in part on data from the surrogate sensor.

20 Claims, 5 Drawing Sheets

(56) References Cited

U.S. PATENT DOCUMENTS

2017/0195038 A1* 7/2017 Sham ............... H04B 7/18504

OTHER PUBLICATIONS

Cornell, Alex et al, "Gofor: Drones on Demand," www.gofordones.com, Jun. 4, 2016.
Prime Industries, "The Innovative Use of Drones in Aircraft Maintenance and Repair," Jan. 30, 2016.
UKIPO Search Report for Application No. GB1716601.8 dated Mar. 13, 2018 (5 pages).
"Mel-frequency cepstrum", dated Aug. 2016, available at: https://web.archive.org/web/20160817175128/https://en.wikipedia.org/wiki/Mel-frequency_cepstrum; Wikipedia.
"MFCC tutorial", dated to at least 2013 by comments, available at: http://practicalcryptography.com/miscellaneous/machine-learning/guide-mel-frequency-cepstral-coefficients-mfccsi; Practical Cryptography.
Tirrell; "Is it possible to use a machine learning algorithm to determine whether or not a voice comes from person 1 or person 2?", date Feb. 2014, available at: https://www.quora.com/Is-it-possible-to-use-a-machine-learning-algorithm-to-determine-whether-or-not-a-voice-comes-from-person-1-or-person-2.
Search Report from United Kingdom Intellectual Property Office dated Feb. 8, 2018 regarding GB Application No. 1713761.3(3 pages).

* cited by examiner

SURROGATE VEHICLE SENSORS

BACKGROUND

Vehicles use sensors to collect data about objects around the vehicle. For example, the sensors can collect data about other vehicles, roadway lanes, road signs, guard rails etc. The vehicles can use the data to operate vehicle components, e.g., a propulsion, a brake, etc. However, when one of the sensors fails, the vehicle may lack data for operating one or more vehicle components, subsystems, etc.

DETAILED DESCRIPTION

A computing device in a vehicle can detect a failure in a sensor and send a request for an unmanned aerial vehicle (UAV) carrying a surrogate sensor. The surrogate sensor is provided to collect data that the failed sensor would collect. The UAV sends the collected data to the vehicle computing device via a vehicle-to-vehicle (V2V) network. By using the UAV carrying the surrogate sensor, the vehicle can operate one or more vehicle subsystems when one or more of the sensors has failed. Furthermore, the UAV can provide data via the surrogate sensor to a vehicle operating in an autonomous mode, i.e., without input from a human operator. Because the vehicle operating in the autonomous mode lacks input from the human operator (or lacks a human operator altogether), the vehicle computing device may be programmed to stop the vehicle and prevent the vehicle from moving as long as the sensor has failed. The UAV and the surrogate sensor allow the vehicle to move to a repair location to repair the failed sensor.

Figure 1:
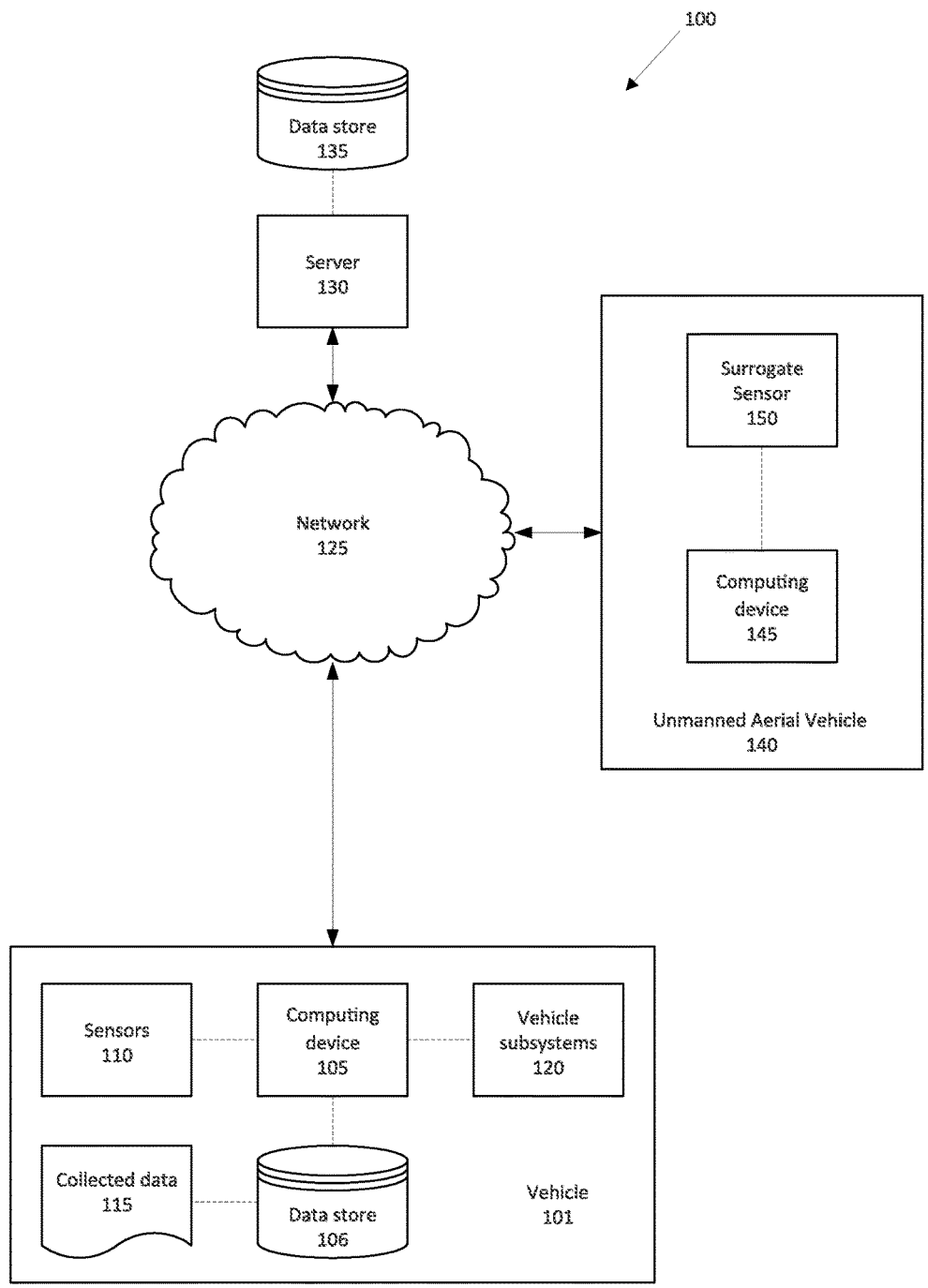
FIG. 1 is a block diagram of an example system for operating a vehicle.

FIG. 1 illustrates a system 100 for operating a vehicle 101. A computing device 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 125, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus. e.g., data 115 relating to vehicle speed, acceleration, position, system and/or component status, etc. Further, other sensors 110 could include cameras, motion detectors, etc., i.e., sensors 110 to provide data 115 for evaluating a location of a target, projecting a path of a parking maneuver, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 may include a plurality of subsystems 120. The subsystems 120 control vehicle 101 components, e.g., a propulsion (including, e.g., an engine, electric motors, etc.) transmission, vehicle seat, mirror, tiltable and/or telescoping steering wheel, etc. The subsystems 120 include, e.g., a steering subsystem, a propulsion subsystem, a brake subsystem, a park assist subsystem, an adaptive cruise control subsystem, etc. The computing device 105 may actuate the subsystems 120 to control the vehicle 101 components, e.g., to stop the vehicle 101, to avoid targets, etc. The computing device 105 may be programmed to operate some or all of the subsystems 120 with limited or no input from a human operator, i.e., the computing device 105 may be programmed to operate the subsystems 120 as a virtual operator. When the computing device 105 operates the subsystems 120 as a virtual operator, the computing device 105 can ignore input from the human operator with respect to subsystems 120 selected for control by the virtual operator, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during virtual operator steering operation, the computing device 105 may ignore the movement of the steering wheel and steer the vehicle 101 according to its programming.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth. IEEE 802.11, etc.), local area networks (LAN) and/or wide area networks (WAN), including the Internet, providing data communication services.

Figure 3:
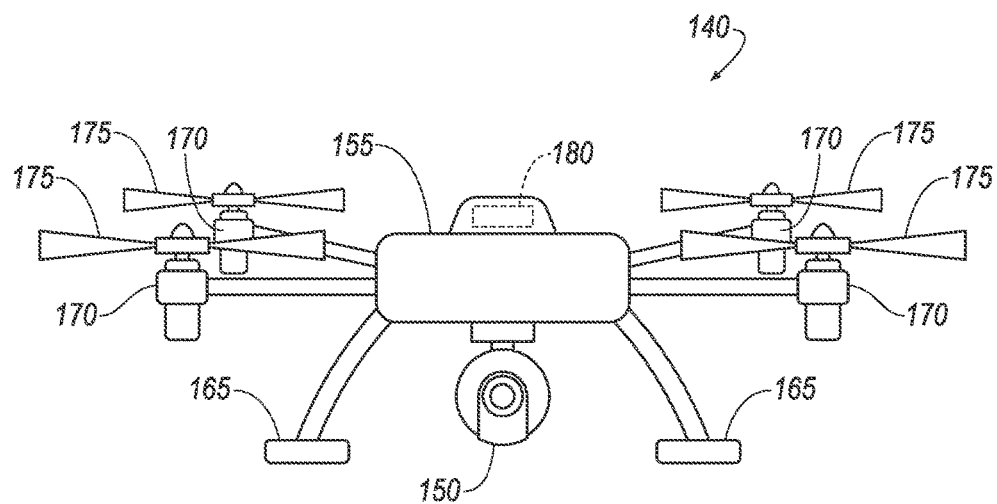
FIG. 3 illustrates an example unmanned aerial vehicle that provides data to the example vehicle of FIG. 1.
Figure 4:
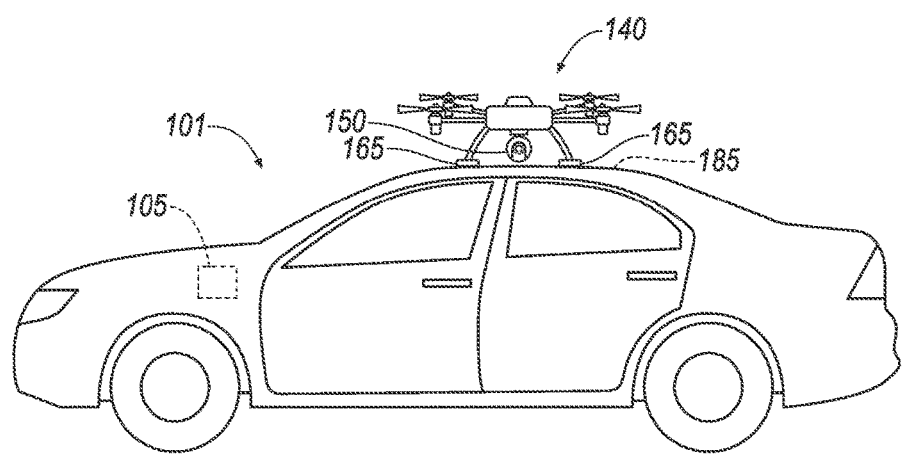
FIG. 4 illustrates the example unmanned aerial vehicle attached to the example vehicle of FIG. 1.

The system 100 may include an unmanned aerial vehicle (UAV) 140. The UAV 140 includes a computing device 145 and at least one surrogate sensor 150. The UAV 140 is operable to navigate to the vehicle 101 in a known manner, typically after receiving a command from the server 130. The UAV computing device 145 is programmed to collect data 115 with the surrogate sensor 150. The UAV computing device 145 is further programmed to provide the collected data 115 to the vehicle computer 105. e.g., via wireless communications such as are known. The UAV 140 as shown in FIGS. 3-4 is illustrated as a quadcopter, i.e., a helicopter having four propellers, but the UAV 140 may be, e.g., a helicopter having three to eight propellers, a fixed-wing drone, etc.

The UAV 140 may include at least one surrogate sensor 150. The surrogate sensor 150 collects data 115 that can be sent via the network 125 to, e.g., the computing device 105. That is, the surrogate sensor 150 may be programmed to collect data 115 that the computing device 105 lacks because one or more sensors 110 have failed. The surrogate sensor 150 may be, e.g., a radar, a LIDAR, a camera, an ultrasonic transducer, etc. Furthermore, the surrogate sensor 150 may be separable from the UAV 140. i.e., the surrogate sensor 150 can include a securing member (not shown), e.g., a magnet, a bolt, a clamp, etc., that attaches to and to can be separated from a port (not shown) on the UAV 140. The port can include. e.g., a magnet, a slot, etc. that engages the securing member of the surrogate sensor 150. The securing member and the port can be selectively engaged and disengaged to allow the current surrogate sensor 150 to be swapped with another surrogate sensor 150, as described below. Thus, the UAV computing device 145 can select one of a plurality of surrogate sensors 150 to be attached to the UAV 140 before moving to the vehicle 101 For example, the UAV computing device 145 can actuate the magnet in the port engaging the magnet in the needed surrogate sensor 150. Alternatively, a worker may attach the surrogate sensor 150 to the UAV 140.

Figure 2:
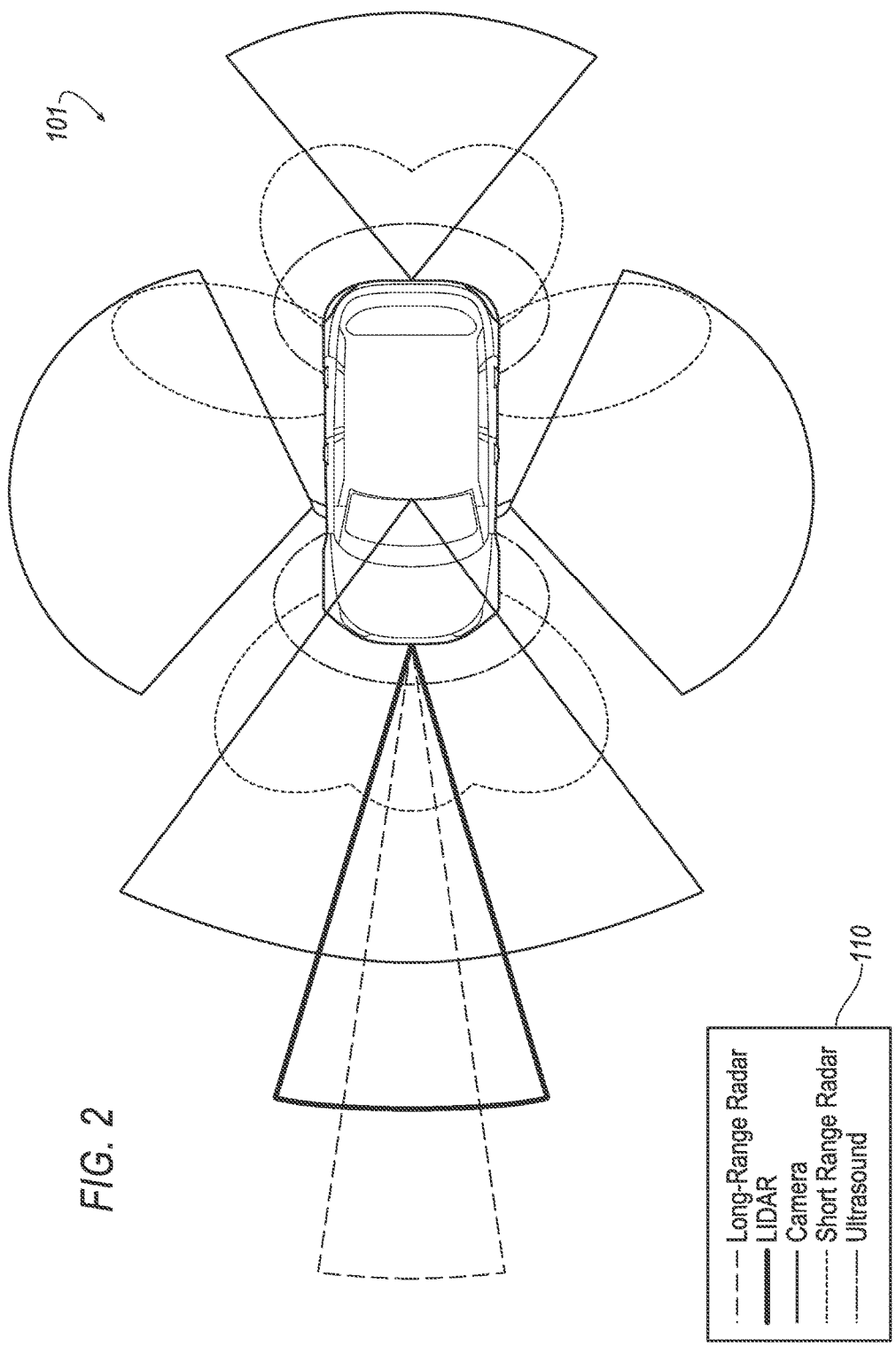
FIG. 2 illustrates a plurality of sensors installed in the example vehicle of FIG. 1.

FIG. 2 illustrates an example of the vehicle 101 with a plurality of sensors 110. The sensors 110 collect data 115 from around the vehicle 101 that the computing device 105 uses to operate the vehicle subsystems 120. The sensors 110 collect data 115 from different areas around the vehicle 101 and at different distances from the vehicle 101. The legend in FIG. 2 identifies a line for each type of sensor 110. The corresponding lines in FIG. 2 represent the typical distances and directions in which a particular sensor 110 may collect data 115, which are described in further detail below. For example, the thick solid line represents the distance and direction that a LIDAR sensor 110 would typically collect data 115. In another example, the short dashed line represents the distance and direction that a short range radar sensor 110 would typically collect data 115. While FIG. 2 is represented as a 2-dimensional image, the sensors 110 can collect data 115 in a 3-dimensional shape. For example, the distance that the LIDAR sensor 110 can collect data 115, shown in the thick solid line, is shown as a triangle extending from a front of the vehicle 101, but the LIDAR sensor 110 may collect data 115 in a cone extending from the front of the vehicle 101, which is projected to the 2-dimensional triangle shown in FIG. 2.

The sensors 110 may include a short range radar sensor 110 and a long range radar sensor 110 such as are known. The short range radar sensor 110 collects data 115 on obstacles near the vehicle 101, e.g., within 5 meters of the vehicle 101. The computing device 105 may use the data 115 collected by the short range radar sensor 110 for, e.g., detecting a target vehicle 101 in a blind spot, detecting a target vehicle 101 behind the vehicle 101 and sending a rear collision warning to the target vehicle 101, sending a cross traffic alert, etc. The long range radar sensor 110 may collect data 115 that the computing device 105 beyond the range of the short range radar sensors 110, e.g., more than 5 meters from the vehicle 101. The computing device 105 may use the data 115 collected by the long range radar sensor 110 to actuate, e.g., an adaptive cruise control.

The sensors 110 may include a LIDAR sensor 110. The LIDAR sensor 110 may collect data 115 from a laser reflecting off of obstacles, pedestrians, and/or other vehicles 101 in front of the vehicle 101. The computing device 105 can use the data 115 collected by the LIDAR sensor 110 to operate, e.g., the brake subsystem 120 to slow and/or stop the vehicle 101 to avoid a collision.

The sensors 110 may include a camera sensor 110. The camera sensor 110 collects image data 115, i.e., arrays of visual data 115 in visible light wavelengths. The camera sensor 110 may collect data 115 around the vehicle 101, including data 115 on, e.g., road signs, roadway markings, parking lot markings, etc. The computing device 105 may use the data 115 collected by the camera 110 to, e.g., send a lane departure warning to a vehicle 101 occupant, to assist in a parking maneuver, to follow instructions on the road sign, etc.

The sensors 110 may include an ultrasonic sensor 110. The ultrasonic sensor 110 collects data 115 from acoustic vibrations (typically above 20 kHz) reflected off of objects near the vehicle 101. e.g., within 2 meters of the vehicle 101. The computing device 105 may use the data 115 collected by the ultrasonic sensor 110 for, e.g. a park assist maneuver. That is, the ultrasonic sensor 110 may be a proximity sensor 110 that detects an obstacle that may collide with the vehicle 101. The ultrasonic sensor 110 may be located at a vehicle 101 front bumper and/or a vehicle 101 rear bumper to detect obstacles approaching the vehicle 101 from the front and/or from the rear.

The computing device 105 can be programmed to detect a failure in one of the sensors 110. The computing device 105 can include a known diagnostic procedure to determine whether the sensors 110 are operational. For example, the computing device 105 may detect a failure in one of the sensors 110 when one of the sensors 110 fails to send data 115 to the computing device 105 upon instruction from the computing device 105.

FIG. 3 illustrates an example UAV 140. The UAV 140 includes a chassis 155. The chassis 155 supports the UAV computing device 145 and the surrogate sensor 150. While illustrated in FIG. 3 as a camera, the surrogate sensor 150 may be a radar, a LIDAR, or an ultrasonic transducer, as described above. That is, the surrogate sensor 150 may be programmed to collect data 115 that the failed sensor 110 would have collected. Furthermore, while one surrogate sensor 150 is shown in the example of FIG. 3, the UAV 140 may carry more than one surrogate sensor 150. The UAV 140 may further include a battery 180 supported by the chassis 155 to power the surrogate sensor 150.

The UAV 140 may include at least one foot 165. The foot 165 allows the UAV 140 to attach to the vehicle 101, e.g., on a roof 185 of the vehicle 101 as shown in FIG. 4. The foot 165 is connected to the chassis 155. The example UAV 140 of FIG. 3 has two feet 165. The feet 165 may be constructed of a ferromagnetic material and may include an electromagnet, i.e., the feet 165 in this example are magnetic feet 165. The battery 180 may supply an electric current to the electromagnet to generate an electromagnetic field, magnetizing the feet 165 and attracting the feet 165 to a nearby ferromagnetic surface, e.g., an exterior of a roof 185 of a vehicle 101. In another example, the feet 165 may include a permanent magnet that does not require power from the battery 180. Although magnets are disclosed herein as an example attachment means, it is possible that other attachment means could be used.

The UAV 140 includes a propulsion means such as a motor 170 connected to a propeller 175. The motor 170 can drive the propeller 175, generating lift and allowing the UAV 140 to fly and to hover. The motor 170 may be an electric motor 170 powered by the battery 180. The motor 170 may be attached to the chassis 155. The example UAV 140 of FIG. 3 includes four motors 170 driving four propellers 175. The UAV computing device 145 may selectively actuate the propellers 175 to steer the UAV 140, as is known.

FIG. 4 illustrates an example vehicle 101 with a UAV 140 sending data 115 from the surrogate sensor 150 to a computing device 105. The UAV 140 in the example of FIG. 4 is attached to an exterior of a roof 185 of the vehicle 101 via the feet 165. The computing device 105 may select a position on the vehicle 101 for the UAV 140 to attach. The position may be based on type of sensor 150 to be deployed and/or data 115 required by the computing device 105. For example, if the UAV 140 and the surrogate sensor 150 collect data 115 that a short range radar sensor 110 would typically collect, the computing device 105 may select the position as a middle of the roof 185 so that the surrogate sensor 150 can collect data from in front of, behind, and to the sides of the vehicle 101. In another example, if the UAV 140 and the surrogate sensor 150 collect data 115 that a LIDAR sensor 110 would typically collect, the computing device 105 may select the position as a front of the roof 185 or a front hood of the vehicle 101 to allow the surrogate sensor 150 to collect data 115 in front of the vehicle 101. The computing device 105 may alternatively instruct the UAV 140 to hover above the vehicle 101 to extend a range of a sensor 150 to collect data 115 that the surrogate sensor 150 could not collect when attached to the roof 185.

To determine an attachment position, the computing device 105 and/or the UAV computing device 145 may define and utilize a three-dimensional coordinate system. The computing device 105 may have a three-dimensional model of the vehicle 101 defined in the three-dimensional coordinate system from, e.g., a computer-aided design (CAD) model, a finite element analysis (FEA) model, etc., as is known. The three-dimensional model may include coordinates for a surface of the vehicle 101, including an exterior surface of the roof 185, an exterior surface of the vehicle 101 hood, etc. Based on the surrogate sensor 150 and the data 115 collected, the computing device 105 may select a set of coordinates (i.e., a position) in the three-dimensional coordinate system that correspond to a portion of the exterior surface of the vehicle 101. For example, as shown in FIG. 2, if the surrogate sensor 150 is a LIDAR, then the surrogate sensor 150 would collect data 115 from in front of the vehicle 101. The computing device 105 can then determine the position to collect the data 115 in front of the vehicle 101. e.g., a position on the vehicle 101 hood. In another example, if the surrogate sensor 150 is a camera, which collects data 115 from in front, behind, and to the sides of the vehicle 101, the computing device 105 may determine the position as a center of the roof 185.

Further, the computing device 105 may store a predetermined distance and direction (i.e., range) for each sensor 110 to collect data 115 (e.g., as shown in FIG. 2), and a predetermined range for the surrogate sensor 150 to collect data 115 (e.g., transmitted from the UAV computing device 145 and/or the server 130). The computing device 105 may determine the position on the vehicle 101 so that the surrogate sensor 150 can collect data 115 from the range that the failed sensor 110 could collect. Further still, the computing device 105 can determine the position to be a predetermined distance above the roof 185, indicating that the UAV 140 should hover over the roof 185 at the predetermined distance. By hovering over the roof 185, the surrogate sensor 150 can collect data 115 at a range that the failed sensor 110, which is installed in the vehicle 101, could not collect.

Upon determining the position on the vehicle 101 for the UAV 140 to attach or hover, the computing device 105 can identify the position of the UAV 140 in the coordinate system and instruct the UAV computing device 145 to move the UAV 140 to the determined attachment or hovering position. That is, the computing device 105 can determine a path from the position of the UAV 140 to the determined position and can provide instructions to the UAV computing device 145 indicating the directions and distances that the UAV 140 can move to attach to the vehicle 101. Furthermore, the computing device 105 can instruct the UAV computing device 145 to actuate the magnetic feet 165 when the UAV 140 reaches the position on the vehicle 101 to secure the UAV 140 to the vehicle 101.

The surrogate sensor 150 collects data 115 from around the vehicle 101 and sends the data 115 to the computing device 105. The computing device 105 instructs the UAV computing device 145 to collect data 115 with the surrogate sensor 150 that the failed sensor 110 would have collected. For example, if the failed sensor 110 was the camera sensor 110, the computing device 105 may instruct the UAV computing device 145 to collect visual data 115 with the surrogate sensor 150. The computing device 105 may communicate with the UAV computing device 145 via known vehicle-to-vehicle (V2V) communications, e.g., dedicated short range communications (DSRC), Bluetooth, Wi-Fi, etc.

Figure 5:
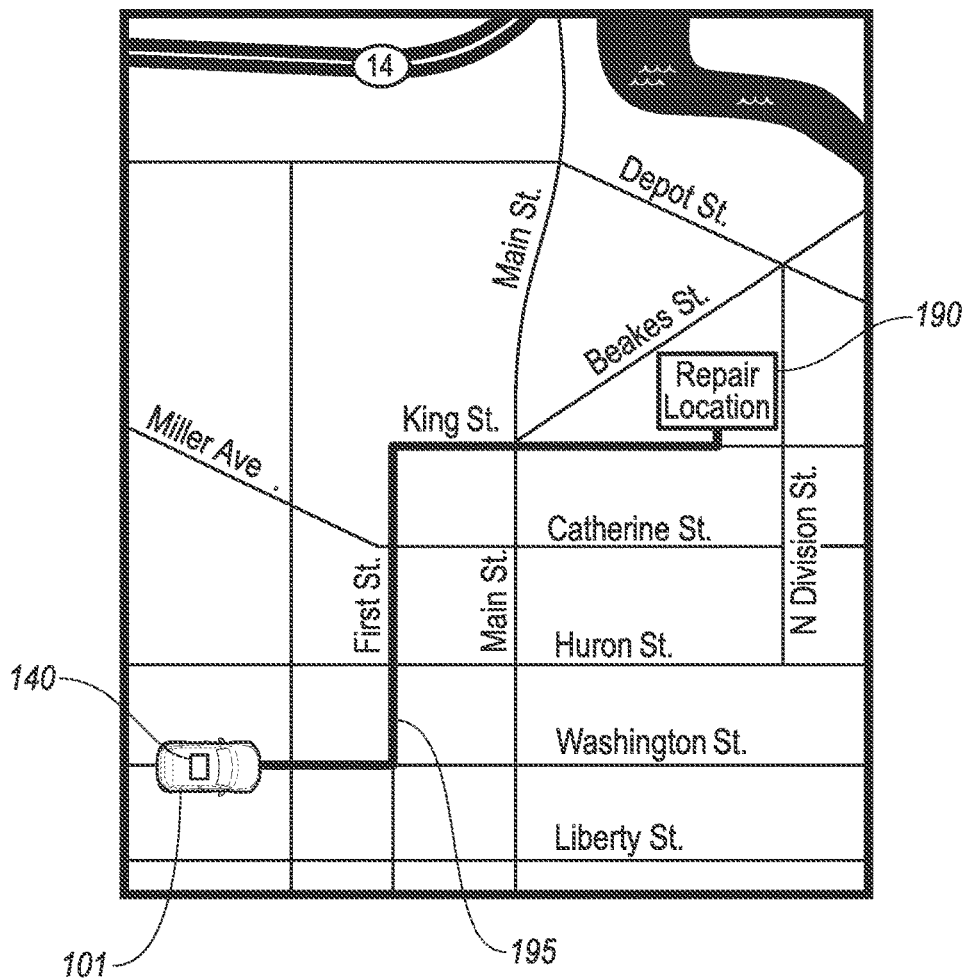
FIG. 5 illustrates an example route to a repair location that the example vehicle of FIG. 1 travels.

FIG. 5 illustrates an example repair location 190 and a route 195 from the vehicle 101 to the repair location 190. The computing device 105 and/or the server 130 may determine the repair location 190 to repair the failed sensor 110. Upon identifying the repair location 190, the computing device 105 may use location data 115 to determine the route 195 to the repair location 190. The route 195 may be determined based on, e.g., the fastest time to reach the repair location 190, the shortest distance to the repair location 190, avoiding highways, avoiding overpasses that may strike the UAV 140 when the UAV is located on the roof 185, etc. The computing device 105 may then actuate one or more vehicle subsystems 120 based on data 115 received from the UAV 140 to move the vehicle 101 along the route 195 to the repair location 190.

Figure 6:
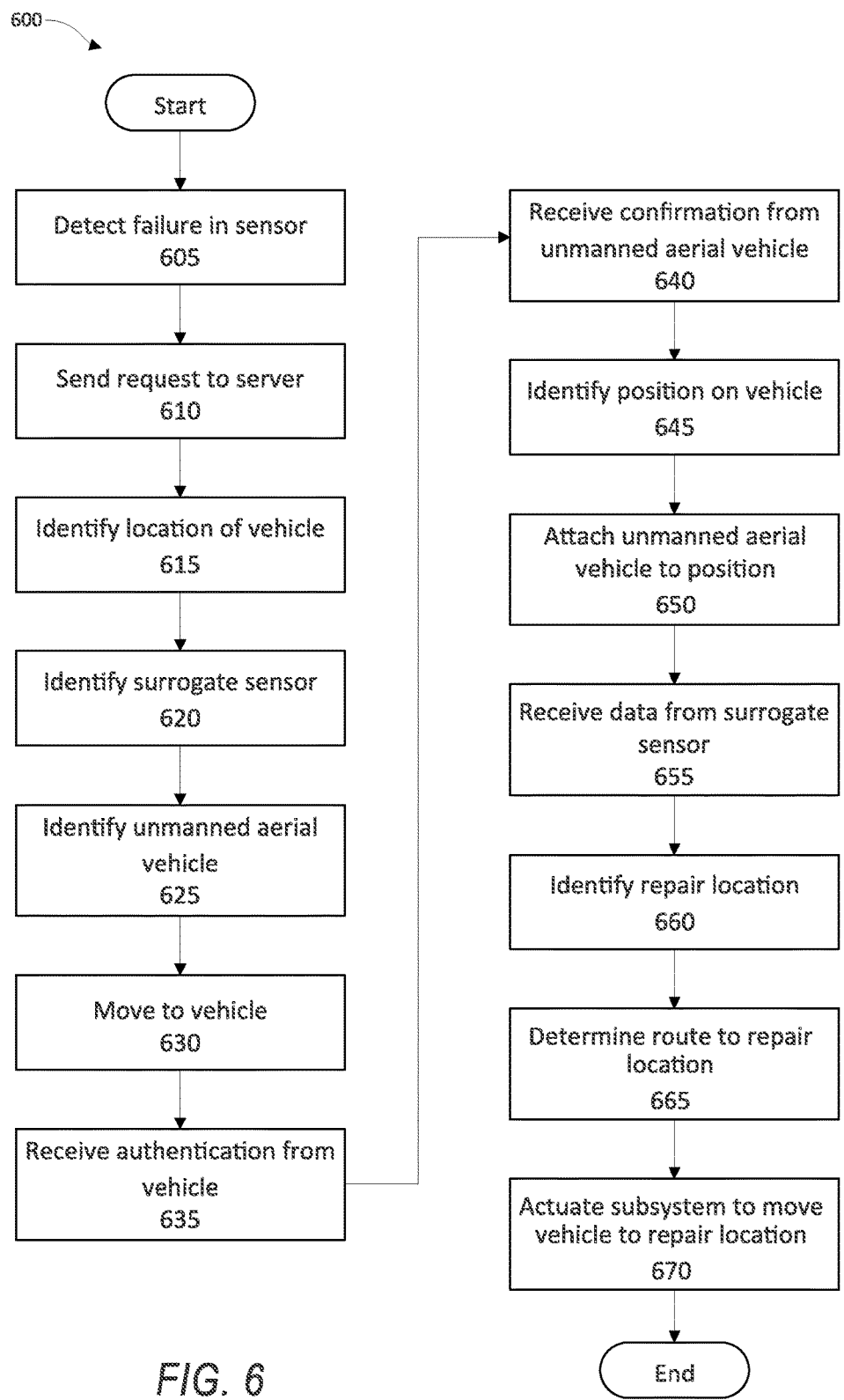
FIG. 6 illustrates an example process for operating the vehicle of FIG. 1 with data from the example unmanned aerial vehicle.

FIG. 6 illustrates a process 600 for operating a vehicle 101 according to data 115 from a surrogate sensor 150 in an unmanned aerial vehicle 140. The process 600 beings in a block 605, in which the computing device 105 detects a failure in one of the sensors 110 as described above.

Next, in a block 610, the computing device 105 sends a request to the server 130 over the network 125 for an unmanned aerial vehicle 140 having at least one surrogate sensor 150. The request typically includes an identification of the failed sensor 110, e.g. by specifying a type of sensor 110, a location of the sensor 110 in or on the vehicle 101, and/or other information to allow selection of a surrogate sensor 150. The server 130 can use the identification of the failed sensor 110 to identify a UAV 140 with a surrogate sensor 150 that can collect data 115 that the failed sensor 110 would typically collect. Alternatively, the server 130 can cause a UAV 140 to be equipped with a specified sensor 150 before journeying to the vehicle 101, as described above. For example, if the failed sensor 110 is a camera 110, then server 130 can select or equip a UAV 140 having a surrogate sensor 150 that can collect image data 115. Furthermore, the request may include identifying information about the vehicle 101 that the server 130 can use to identify the vehicle 101. For example, the request may include a vehicle 101 identification number (VIN), a license plate number, etc.

Next, in a block 615, the server 130 identifies the location of the vehicle 101. The request may include geographic location data 115 of the vehicle 101, and the server 130 may use the location data 115 to identify the location of the vehicle 101.

Next, in a block 620, the server 130 identifies the surrogate sensor 150 required for the vehicle 101. The server 130 uses the identification of the failed sensor 110 in the request to determine the appropriate surrogate sensor 150 that collects data 115 that the failed sensor 110 would have collected. For example, if the failed sensor 110 is identified as a short range radar sensor 110, the server 130 may identify the surrogate sensor 150 to be a radar.

Next, in a block 625, the server 130 identifies a UAV 140 to send to the vehicle 101. The server 130 may store a location for a plurality of UAVs 140 and select the UAV 140 that has a location closest to the location of the vehicle 101. Alternatively, the server 130 may identify a UAV 140 that has the surrogate sensor 150 that is the same type as the failed sensor 110.

Next, in a block 630, the server 130 instructs the UAV 140 to move to the location of the vehicle 101. The server 130 may instruct the UAV computing device 145 to actuate the motors 170 to spin the propellers 175 and move the UAV 140 to the location of the vehicle 101. The server 130 can also send the identifying information of the vehicle 101 of the UAV computing device 145, e.g., the vehicle 101 identification number, the license plate number, etc.

Next, in a block 635, the UAV computing device 145 receives an authentication from the computing device 105 upon reaching the location of the vehicle 101. The authentication may be a message sent over the network 125 that includes information identifying the vehicle. e.g., the vehicle 101 identification number, the license plate number, etc. The UAV computing device 145 compares the information in the authentication sent from the computing device 105 to the information identifying the vehicle 101 sent from the server 130 to determine that the UAV 140 is communicating with the correct vehicle 101. The authentication may further include an identification of the failed sensor 110, and the UAV computing device 145 may compare the identification of the failed sensor 110 to the surrogate sensor 150 to confirm that the surrogate sensor 150 can provide data 115 that the computing device 105 could have collected with the failed sensor 110.

Next, in a block 640, the computing device 105 receives a confirmation from the UAV computing device 145. The confirmation may be a message sent over the network 125 indicating that the information identifying the vehicle 101 in the request and the information from the authentication math. That is, the confirmation confirms that computing device 105 is communicating with the correct UAV 140. The confirmation may further include an identification of the surrogate sensor 150.

Next, in a block 645, the computing device 105 identifies a position on the vehicle 101 for the UAV 140 to land. The position may be determined based on the data 115 collected by the surrogate sensor 150. For example, as described above, if the surrogate sensor 150 is a short range radar, the position may be a middle of a roof 185 of the vehicle 101 to collect data 115 from in front of, behind, and to the sides of the vehicle 101. In another example, if the surrogate sensor 150 is a LIDAR, the position may be a front of the roof 185 to collect data 115 in front of the vehicle 101. Alternatively, the computing device 105 may instruct the UAV computing device 145 to hover above the vehicle 101 at a specified position in a coordinate system that includes the vehicle 101.

Next, in a block 650, the UAV computing device 145 instructs the motors 170 to move the UAV 140 to the position and further instructs the magnetic feet 165 to attach to the position on the vehicle 101. As described above, the computing device 105 can identify a position in a three-dimensional coordinate system on the vehicle 101 to which the UAV 140 can attach. The computing device 105 can further identify a position of the UAV 140 in the three-dimensional coordinate system and instruct the UAV computing device 145 to move the UAV 140 to the position on the vehicle 101. Alternatively, the UAV computing device 145 may instruct the motors 170 to hover above the vehicle 101, i.e., the position is above the vehicle 101 in the coordinate system.

Next, in a block 655, the computing device 105 receives data 115 from the surrogate sensor 150. The UAV computing device 145 may send data 115 collected by the surrogate sensor 150 to the computing device 105 over the network 125. The computing device 105 may use the data 115 from the surrogate sensor 150 where the computing device 105 would typically use data 115 from the failed sensor 110. That is, the computing device 105 can use the data 115 from the surrogate sensor 150 to actuate the vehicle subsystems 120.

Next, in a block 660, the computing device 105 identifies a repair location 190. The computing device 105 may use navigation data 115 from a navigational subsystem, e.g., a GPS, to determine the nearest repair location 190. Furthermore, the data store 106 may include a plurality of repair locations 190 that may repair the failed sensor 110. Alternatively, the server 130 can identify the repair location 190 and send the repair location 190 to the computing device 105 and/or the UAV computing device 145.

Next, in a block 665, the computing device 105 determines a route 195 to the repair location 190. The computing device 105 may use navigation data 115 to determine the route 195 from the current position of the vehicle 101 to the repair location 190. As described above, the route 195 may be determined by the computing device 105 based on, e.g., the distance to the repair location 190, the time to travel to the repair location 190, etc.

Next, in a block 670, the computing device 105 actuates one or more of the subsystems 120 based on the data 115 from the surrogate sensor 150 to move the vehicle 101 along the route 195 to the repair location 190, and the process 600 ends. For example, the computing device 105 may actuate a propulsion subsystem 120 to move the vehicle 101 and a steering subsystem 120 to steer the vehicle 101 along the route 195.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   upon detecting a failure in a sensor in a vehicle, send a request to a remote site to provide an unmanned aerial vehicle located at the remote site carrying a surrogate sensor selected to replace the sensor;
   establish communications with the unmanned aerial vehicle carrying the surrogate sensor; and
   actuate a vehicle subsystem based at least in part on data from the surrogate sensor.

2. The system of claim 1, wherein the instructions further include instructions to identify a position on the vehicle and to instruct the unmanned aerial vehicle to attach to the vehicle at the position.

3. The system of claim 1, wherein the instructions further include instructions to identify a position that is a predetermined distance above the vehicle and to instruct the unmanned aerial vehicle to hover above the vehicle at the position.

4. The system of claim 1, wherein the sensor is one of a radar, a LIDAR, a camera, and an ultrasonic transducer.

5. The system of claim 1, wherein the request includes an identification of a type of failed sensor.

6. The system of claim 1, wherein the unmanned aerial vehicle is programmed to hover above the vehicle.

7. The system of claim 1, wherein the instructions further include instructions to:
   identify a repair location;
   determine a route to the repair location; and
   actuate the vehicle subsystem to move the vehicle to the repair location based at least in part on the data from the surrogate sensor.

8. The system of claim 1, wherein the vehicle subsystem is one of an adaptive cruise control subsystem, a brake subsystem, a collision avoidance subsystem, a propulsion subsystem, and a park assist subsystem.

9. A method, comprising:
   upon detecting a failure in a sensor in a vehicle, sending a request to a remote site to provide an unmanned aerial vehicle located at the remote site carrying a surrogate sensor;
   establishing communications with the unmanned aerial vehicle carrying the surrogate sensor; and
   actuating a vehicle subsystem based at least in part on data from the surrogate sensor.

10. The method of claim 9, further comprising identifying a position on the vehicle and to instruct the unmanned aerial vehicle to attach to the vehicle at the position.

11. The method of claim 9, further comprising identifying a position that is a predetermined distance above the vehicle and instructing the unmanned aerial vehicle to hover above the vehicle at the position.

12. The method of claim 9, wherein the sensor is one of a radar, a LIDAR, a camera, and an ultrasonic transducer.

13. The method of claim 9, wherein the request includes an identification of a type of failed sensor.

14. The method of claim 9, wherein the unmanned aerial vehicle is programmed to hover above the vehicle.

15. The method of claim 9, further comprising:
identifying a repair location;
determining a route to the repair location; and
actuating the vehicle subsystem to move the vehicle to the repair location based at least in part on the data from the surrogate sensor.

16. The method of claim 9, wherein the vehicle subsystem is one of an adaptive cruise control subsystem, a brake subsystem, a collision avoidance subsystem, a propulsion subsystem, and a park assist subsystem.

17. A system, comprising a computer including a processor and a memory, the memory storing instructions executable by the computer to:
receive a request including information identifying a vehicle, a location of the vehicle, and a failed sensor in the vehicle; and
actuate a motor of an unmanned aerial vehicle located at a remote site having a surrogate sensor that is a same type as the failed sensor to move the unmanned aerial vehicle to the location of the vehicle.

18. The system of claim 17, wherein the instructions further include instructions to instruct the unmanned aerial vehicle to collect data with the surrogate sensor and to send the data to the vehicle.

19. The system of claim 17, wherein the instructions further include instructions to send the information identifying the vehicle from the request to the unmanned aerial vehicle and to instruct the unmanned aerial vehicle to compare the information identifying the vehicle from the request to an authentication sent from the vehicle when the unmanned aerial vehicle arrives at the location of the vehicle.

20. The system of claim 17, wherein the instructions further include instructions to:
identify a repair location;
determine a route from the location of the vehicle to the repair location; and
instruct the vehicle to actuate a vehicle subsystem to move the vehicle to the repair location based at least in part on data from the surrogate sensor.

* * * * *